United States Patent
Abram et al.

(10) Patent No.: US 11,168,777 B2
(45) Date of Patent: Nov. 9, 2021

(54) OFFSET IDLER HUB FOR BACKLASH CONTROL

(71) Applicant: CUMMINS INC., Columbus, IN (US)

(72) Inventors: Kwin Abram, Columbus, IN (US); David J. Moenssen, Columbus, IN (US)

(73) Assignee: Cummins Inc., Columbus, IN (US)

( * ) Notice: Subject to any disclaimer, the term of this patent is extended or adjusted under 35 U.S.C. 154(b) by 336 days.

(21) Appl. No.: 16/328,508

(22) PCT Filed: Aug. 16, 2017

(86) PCT No.: PCT/US2017/047133
§ 371 (c)(1),
(2) Date: Feb. 26, 2019

(87) PCT Pub. No.: WO2018/044569
PCT Pub. Date: Mar. 8, 2018

(65) Prior Publication Data
US 2021/0190194 A1    Jun. 24, 2021

Related U.S. Application Data

(60) Provisional application No. 62/381,713, filed on Aug. 31, 2016.

(51) Int. Cl.
| F16H 55/18 | (2006.01) |
| F02B 67/04 | (2006.01) |
| F16H 57/022 | (2012.01) |

(52) U.S. Cl.
CPC ............ *F16H 55/18* (2013.01); *F02B 67/04* (2013.01); *F16H 2057/0224* (2013.01)

(58) Field of Classification Search
CPC .............. F16H 55/18; F16H 2034/001; F16H 2057/0224; F16H 57/152; F16H 2057/125; F02B 67/04
See application file for complete search history.

(56) References Cited

U.S. PATENT DOCUMENTS 2,382,846 A    8/1945 Barber
3,830,212 A *  8/1974 Seino .................. F16H 7/06
                                              123/192.2
(Continued)

FOREIGN PATENT DOCUMENTS

DE    102006022190 A1 * 11/2007 ............... F01L 1/02
DE    102009027509 A1 *  1/2011 ............. F16H 57/12
(Continued)

OTHER PUBLICATIONS

International Search Report from corresponding PCT Application No. PCT/US2017/047133, dated Oct. 27, 2017, pp. 1-2.
(Continued)

*Primary Examiner* — Bobby Rushing, Jr.
(74) *Attorney, Agent, or Firm* — Foley & Lardner LLP

(57) ABSTRACT

An apparatus includes a crankshaft gear operatively coupled to an engine. An auxiliary gear is operatively coupled to the engine. An idler gear is operatively coupled to the engine, and is in meshed engagement with each of the crankshaft gear and the auxiliary gear. A ring dowel is fixedly coupled to an engine block. An idler hub has an inner surface and an outer surface. The inner surface is fixedly coupled to the ring dowel and the idler gear is rotatably coupled to the outer surface. The idler hub is eccentrically-shaped so that an idler gear centerline is offset from a ring dowel centerline so as to reduce a crankshaft backlash between the crankshaft gear and the idler gear relative to a nominal crankshaft backlash, and so as to substantially maintain an auxiliary backlash between the auxiliary gear and the idler gear relative to a nominal auxiliary backlash.

20 Claims, 3 Drawing Sheets

(56) References Cited

U.S. PATENT DOCUMENTS

| | | | |
|---|---|---|---|
| 4,944,195 A | 7/1990 | Takahashi | |
| 5,540,112 A * | 7/1996 | Baker | F16H 57/022 |
| | | | 74/397 |
| 5,685,197 A | 11/1997 | Baker | |
| 5,819,588 A | 10/1998 | Deane | |
| 5,960,761 A * | 10/1999 | Kawakubo | F02B 61/02 |
| | | | 123/192.2 |
| 6,364,803 B1 | 4/2002 | Barnholt | |
| 7,185,515 B2 * | 3/2007 | Shue | C03B 9/41 |
| | | | 65/236 |
| 8,857,389 B2 | 10/2014 | Mukouhara | |
| 2013/0175963 A1 | 7/2013 | Yamada | |
| 2014/0360297 A1* | 12/2014 | Yamauchi | F16H 57/12 |
| | | | 74/409 |
| 2015/0176698 A1 | 6/2015 | Vandewal | |
| 2015/0226303 A1* | 8/2015 | Dumanski | F16H 55/18 |
| | | | 74/440 |
| 2015/0276040 A1 | 10/2015 | Burrell et al. | |
| 2016/0076635 A1* | 3/2016 | Bell | F04C 29/005 |
| | | | 74/396 |
| 2016/0230870 A1* | 8/2016 | Lee | F16F 15/267 |

FOREIGN PATENT DOCUMENTS

| | | | | |
|---|---|---|---|---|
| DE | 102009055214 A1 * | 6/2011 | | F16H 57/022 |
| EP | 1 113 195 | 7/2001 | | |
| EP | 2 171 314 A2 | 4/2010 | | |
| EP | 2664752 A1 * | 11/2013 | | F01L 1/026 |
| EP | 2 886 910 A1 | 6/2015 | | |
| FR | 2641351 | 7/1990 | | |
| JP | 2003-148608 | 5/2003 | | |
| JP | 2003-156144 | 5/2003 | | |
| KR | 1020140013512 | 7/2012 | | |
| KR | 20160026187 A | 3/2016 | | |
| KR | 1020160026187 A | 3/2016 | | |
| WO | WO-2008/145741 | 12/2008 | | |

OTHER PUBLICATIONS

Written Opinion from corresponding PCT Application No. PCT/US2017/047133, dated Oct. 27, 2017, pp. 1-3.

Supplementary Extended Search Report for EP Application No. 17847206.4, dated Apr. 29, 2020, pp. 1-8.

Office Action for EP Application No. 17847206.4, dated Mar. 4, 2021.

Office Action for CN Application No. 2017800509352, dated Jun. 30, 2021.

* cited by examiner

OFFSET IDLER HUB FOR BACKLASH CONTROL

CROSS-REFERENCE TO RELATED APPLICATIONS

The present application is the U.S. national phase of PCT Application No. PCT/US2017/047133, filed Aug. 16, 2017, which claims priority to U.S. Provisional Patent Application No. 62/381,713, entitled "OFFSET IDLER HUB FOR BACKLASH CONTROL" filed Aug. 31, 2016. The contents of these applications are incorporated herein by reference in their entireties.

TECHNICAL FIELD

The present disclosure relates generally to the field of gear systems.

BACKGROUND

A gear train is a system including two or more meshed gears. Some gear trains include an idler gear, which is an intermediate gear that transfers torque between gears, but does not itself drive a shaft to perform work. Idler gears are sometimes used to reverse the direction of rotation between gears.

Backlash in a gear train refers to an amount of clearance between mated gear teeth. Whenever the direction of movement is reversed, gear teeth move from contact on one side to the other as the backlash gap is traversed. The corresponding impact of the teeth causes undesirable noise and vibration. Manufacturing tolerances preclude zero backlash, because all teeth cannot be manufactured to the exact same dimension, and all teeth must mesh without jamming.

SUMMARY

One embodiment relates to an apparatus including a crankshaft gear operatively coupled to an engine. The crankshaft gear has a crankshaft gear centerline. An auxiliary gear is operatively coupled to the engine. The auxiliary gear has an auxiliary gear centerline. An idler gear is operatively coupled to the engine. The idler gear is in meshed engagement with each of the crankshaft gear and the auxiliary gear. The idler gear has an idler gear centerline. A ring dowel is fixedly coupled to an engine block. The ring dowel has a ring dowel centerline. An idler hub has an inner surface and an outer surface. The inner surface is fixedly coupled to the ring dowel and the idler gear is rotatably coupled to the outer surface. The idler hub is eccentrically-shaped so that the idler gear centerline is offset from the ring dowel centerline so as to reduce a crankshaft backlash between the crankshaft gear and the idler gear relative to a nominal crankshaft backlash, and so as to substantially maintain an auxiliary backlash between the auxiliary gear and the idler gear relative to a nominal auxiliary backlash.

Another embodiment relates to an apparatus including a first gear, a second gear, and a hub. The first gear is positioned relative to an engine block. The first gear has a first centerline. The second gear is positioned relative to the engine block. The second gear is in meshed engagement with the first gear. The hub has an inner surface and an outer surface. The inner surface is coupled to the engine block and the outer surface is coupled to the second gear. The hub facilitates rotation of the second gear relative to the engine block. The inner surface has a second centerline. The outer surface has a third centerline offset from the second centerline.

Another embodiment relates to an apparatus including a first gear, a second gear, a third gear, and an idler hub. The first gear is operatively coupled to an engine. The first gear has a first gear centerline. The second gear is operatively coupled to the engine. The second gear has a second gear centerline. The third gear is operatively coupled to the engine. The third gear is in meshed engagement with each of the first gear and the second gear. The third gear has a third gear centerline. The idler hub has an inner surface and an outer surface. The inner surface is fixedly coupled to the engine such that the idler hub is held at a first position relative to the engine. The outer surface is rotatably coupled to the second gear thereby facilitating rotation of the second gear relative to the engine, the idler hub being eccentrically-shaped.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Various embodiments relate to an offset idler hub for use in a gear train including an idler gear, a crankshaft gear, and an auxiliary gear. The offset idler hub is structured to offset a position of the idler gear relative to the crankshaft gear so as to reduce backlash between the crankshaft gear and the idler gear, while maintaining a nominal backlash between the auxiliary gear and the idler gear compared to a system having a symmetric (non-offset) idler hub. Various other embodiments relate to a method of manufacturing an engine, including evaluating backlash and selecting one of an offset idler hub and a symmetric idler hub so as to minimize backlash between the crankshaft gear and the idler gear.

Figure 1:
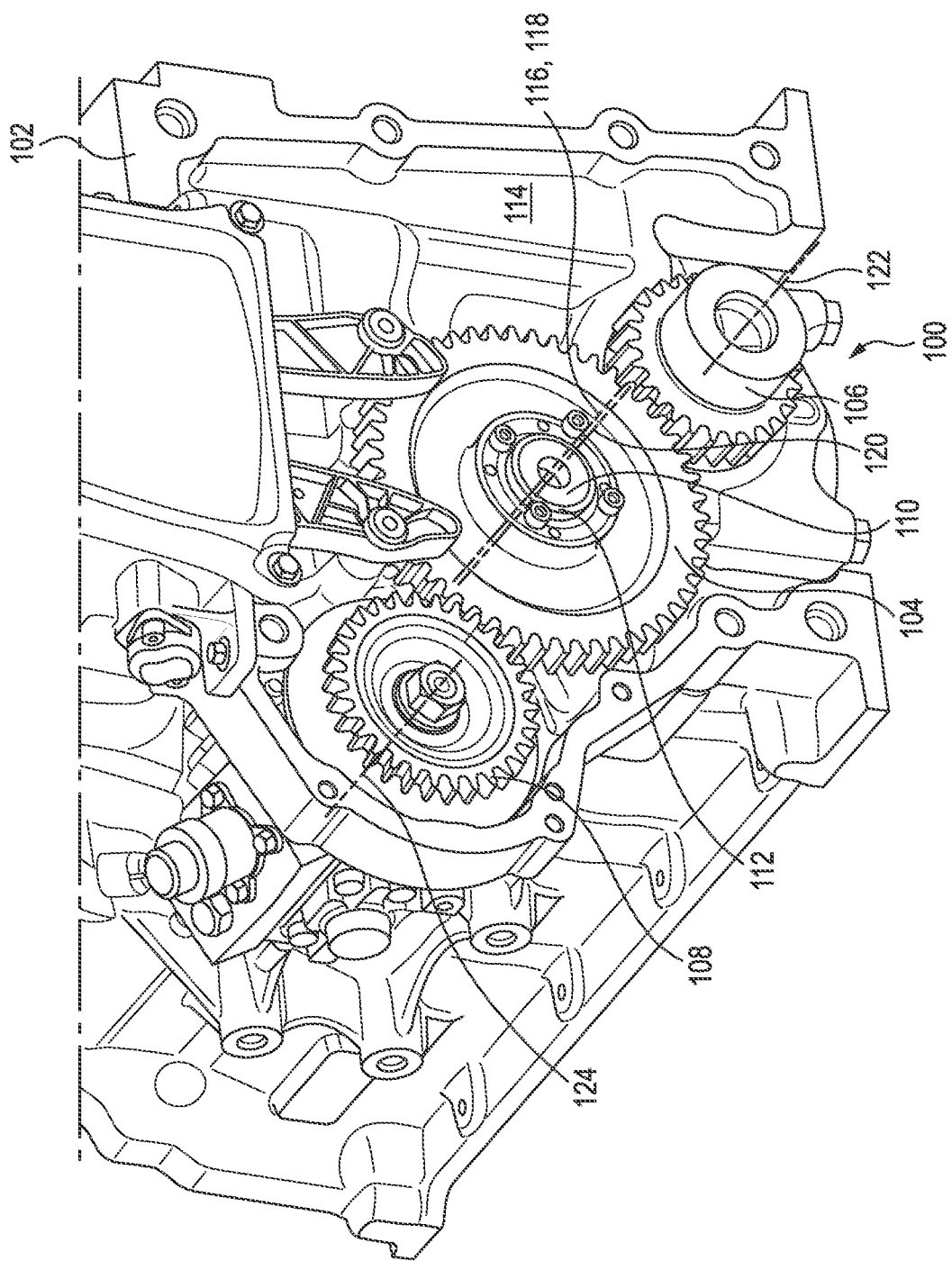
FIG. 1 is a perspective view of a gear train for an engine, according to an embodiment.

FIG. 1 is a perspective view of a gear train 100 for an engine 102, according to an embodiment. The gear train 100 includes an idler gear 104 in meshed engagement with each of a crankshaft gear 106 and an auxiliary gear 108. In an embodiment, the auxiliary gear 108 is a fuel pump pinion. The idler gear 104 is structured to transfer torque between the crankshaft gear 106 and the auxiliary gear 108. The idler gear 104 is rotatably coupled to an offset idler hub 110. More specifically, the idler gear 104 includes a bushing 112 that contacts the offset idler hub 110 to facilitate rotation of the idler gear 104 relative to the offset idler hub 110. The offset idler hub 110 is fixedly coupled (e.g., press-fit) to an engine block 114 of the engine 102. In an embodiment, a ring dowel 115 is fixedly coupled (e.g., press-fit) to the engine block 114, and the offset idler hub 110 is fixedly coupled (e.g., press-fit) to the ring dowel 115.

The idler gear 104 defines an idler gear centerline 116, the offset idler hub 110 defines an idler hub centerline 118, and the ring dowel 115 defines a ring dowel centerline 120. The idler gear centerline 116 and the idler hub centerline 118 are shown by a single line because they are coaxial. Additionally, the crankshaft gear 106 defines a crankshaft gear centerline 122 and the auxiliary gear 108 defines an auxiliary gear centerline 124. In conventional systems including a symmetric idler hub, each of the idler gear centerline 116, the idler hub centerline 118, and the ring dowel centerline 120 would be concentric.

According to various embodiments, the offset idler hub 110 is eccentrically-shaped so as to offset the idler gear centerline 116 from the ring dowel centerline 120. The eccentric shape of the offset idler hub 110 is defined so as to offset the idler gear centerline 116 (and idler hub centerline 118) from the ring dowel centerline 120 by a particular angle and magnitude relative to the engine block 114. The particular angle and magnitude are selected so as to reduce backlash between the idler gear 104 and the crankshaft gear 106, while maintaining a nominal backlash between the idler gear 104 and the auxiliary gear 108. As used herein, the term "nominal backlash" refers to a backlash of a conventional system including a symmetric idler hub in which the idler hub centerline and the idler gear centerline are concentric.

As discussed in further detail below and according to various embodiments, the offset idler hub 110 includes an idler hub pilot feature (not shown) that is structured to engage a corresponding engine block pilot feature in the engine block 114 so as to set a clocking of the offset idler hub 110. In other words, the pilot feature is structured to rotatably constrain the offset idler hub 110 relative to the engine block 114 to maintain the desired angle and magnitude of the offset. In an embodiment, the idler hub pilot feature is a spring dowel pin.

Figure 2:
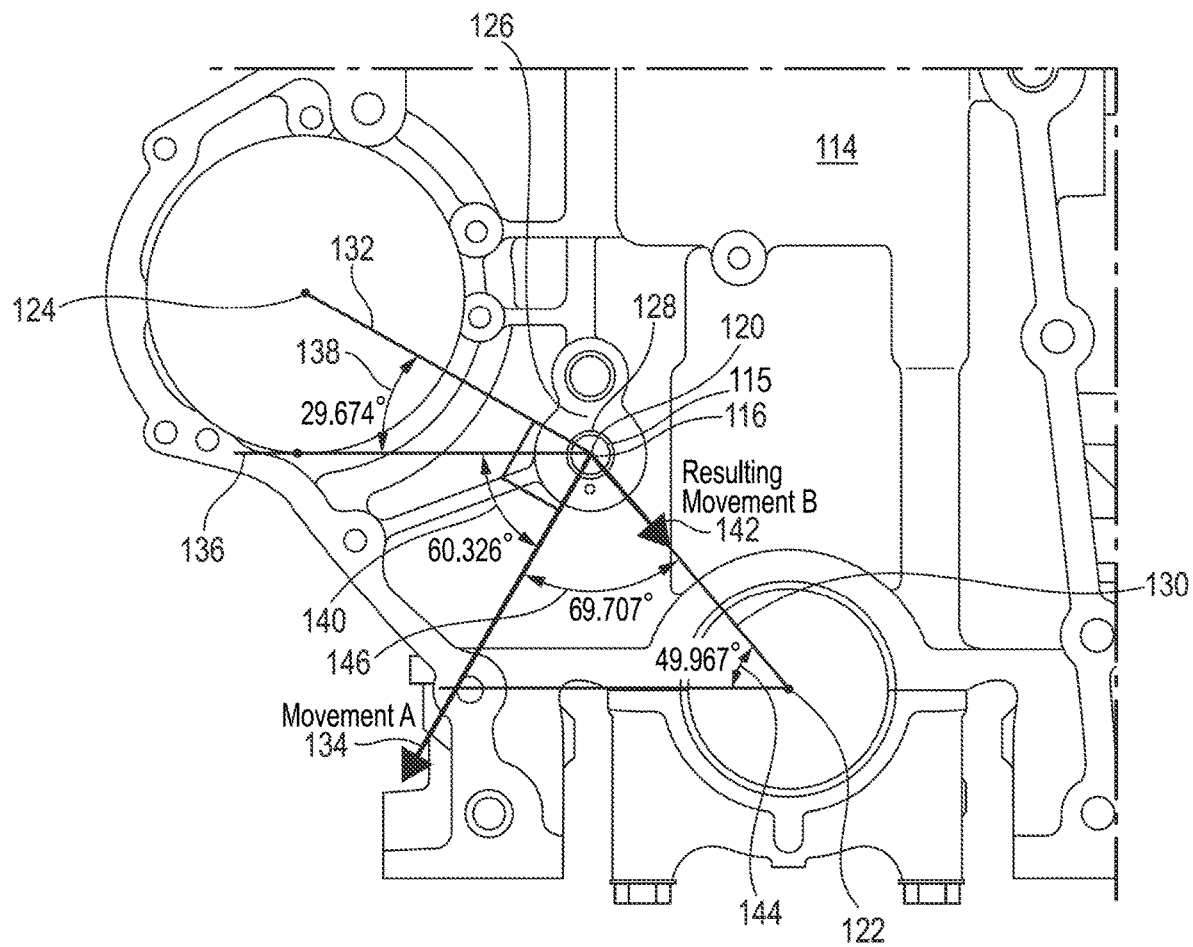
FIG. 2 is a front elevational view illustrating an engine block of the engine of FIG. 1 without the gear train.

FIG. 2 is a front elevational view illustrating the engine block 114 of FIG. 1 without the gear train 100. The idler gear centerline 116, the ring dowel centerline 120, the crankshaft gear centerline 122, and the auxiliary gear centerline 124 are also illustrated in FIG. 2, although the corresponding components are not shown.

As illustrated in FIG. 2, the engine block 114 includes a boss 126 that defines a bore 128. The bore 128 is structured to receive the ring dowel 115 to mount the offset idler hub 110 (FIG. 1). Accordingly, the offset idler hub 110 and the corresponding idler gear 104 are mounted directly to the engine block 114. In contrast, the crankshaft gear 106 and the auxiliary gear are not mounted directly to the engine block 114, but are instead mounted indirectly via other components.

A connecting line is a line extending between two centerlines. The length of a connecting line defines a center distance. A center distance is proportional to a backlash between two corresponding gears. Accordingly, changing the center distance between the centerlines of two gears also changes the backlash between the two gears.

As illustrated in FIG. 2, a crankshaft connecting line 130 extends between the idler gear centerline 116 and the crankshaft gear centerline 122. The crankshaft connecting line 130 defines a crankshaft center distance. An auxiliary connecting line 132 extends between the idler gear centerline 116 and the auxiliary gear centerline 124. The auxiliary connecting line 132 defines an auxiliary center distance.

The crankshaft center distance would be a nominal crankshaft center distance and the auxiliary center distance would be a nominal auxiliary center distance in conventional systems including a symmetric idler hub in which the idler gear centerline 116 and the ring dowel centerline 120 are coincident. In contrast, according to various embodiments of the present disclosure, the offset idler hub 110 is eccentrically-shaped so as to offset the idler gear centerline 116 relative to the engine block 114 such that the idler gear centerline 116 and the ring dowel centerline 120 are not coincident. Accordingly, the crankshaft center distance is an offset crankshaft center distance in embodiments including the offset idler hub 110.

As described further below, the offset idler hub 110 is structured to offset the idler gear centerline 116 from the ring dowel centerline 120 at a particular angle and magnitude relative to the engine block 114. As a result, the offset crankshaft center distance is smaller than the nominal crankshaft center distance. Accordingly, the backlash between the idler gear 104 and the crankshaft gear 106 is reduced. However, the offset does not substantially affect the auxiliary center distance. Accordingly, the auxiliary center distance is substantially the same as the nominal auxiliary center distance in embodiments including the offset idler hub 110. Therefore, the backlash between the idler gear 104 and the auxiliary gear 108 is substantially the same in system configurations including the offset idler hub 110 and in system configurations including a symmetric idler hub. In some embodiments, the auxiliary center distance being "substantially the same" between configurations refers to the auxiliary center distance changing by less than 0.035%. In some embodiments, the auxiliary center distance being "substantially the same" between configurations refers to the auxiliary center distance changing by less than 0.040 mm. In some embodiments, the auxiliary backlash being "substantially the same" between configurations refers to the auxiliary backlash changing by less than 1%. In some embodiments, the auxiliary backlash being "substantially the same" between configurations refers to the auxiliary backlash changing by less than 0.005 mm.

An offset movement 134 defines a magnitude and angle by which the idler gear centerline 116 is offset from the ring dowel centerline 120. The angle of the offset movement 134 is perpendicular to the auxiliary connecting line 132. In other words, the offset movement 134 is 90 degrees relative to the auxiliary connecting line.

The position of the various components of FIG. 2 is described herein relative to the engine block 114. For example, as shown in FIG. 2, an engine block datum 136 is defined as a horizontal axis of the engine block 114. However, the position of the components may similarly be described according to other datums or references. The auxiliary connecting line 132 defines a first angle 138 relative to the engine block datum 136. As stated above, the offset movement 134 is defined by an angle 90 degrees relative to the auxiliary connecting line 132. Accordingly, a second angle 140 also defines the offset movement 134 relative to the engine block 114. The second angle 140 is 90 degrees minus the first angle 138.

Movement of the idler gear centerline 116 relative to the ring dowel centerline 120 according to the offset movement 134 causes a resulting offset movement 142 of the crankshaft gear centerline 122 relative to the idler gear centerline 116. The crankshaft connecting line 130 defines a third angle 144 relative to a line parallel to the engine block datum 136. The resulting offset movement 142 is defined relative to the offset movement 134. In particular, the resulting offset movement 142 is defined by a fourth angle 146 that is 180 degrees minus the second angle 140 minus the third angle 144. A magnitude of the resulting offset movement 142 is defined based on the magnitude of the offset movement 134 and the fourth angle of 146. In particular, the magnitude of the resulting offset movement 142 is the magnitude of the offset movement 134 multiplied by the cosine of the fourth angle 146. Accordingly, the magnitude of the resulting offset movement 142 is smaller than the magnitude of the offset movement 134.

A magnitude of the change in backlash is defined based on the magnitude of the resulting offset movement 142 and a pressure angle between the idler gear 104 and the crankshaft gear 106. In particular, the magnitude of the change in backlash is multiplied by the magnitude of the resulting offset movement 142 multiplied by the tangent of the pressure angle. In an embodiment, the pressure angle is approximately 20 degrees. Accordingly, the change in backlash is 0.728 multiplied by the magnitude of the resulting offset movement 142 or 0.253 multiplied by the magnitude of the offset movement 134.

In an embodiment, the magnitude of the target change in backlash is less than 0.100 mm. In another embodiment, the magnitude of the target change in backlash is less than 0.070 mm. In an embodiment, the target magnitude of the resulting offset movement 142 is less than or equal to 0.500 mm. In another embodiment, the target magnitude of the resulting offset movement 142 is less than or equal to 0.250 mm.

Figure 3:
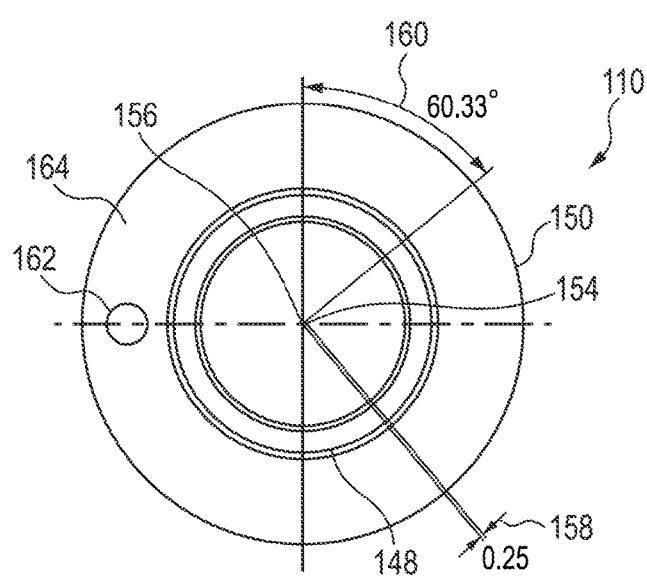
FIG. 3 is a front elevational view illustrating the offset idler hub of FIG. 1.

FIG. 3 is a front elevational view illustrating the offset idler hub 110 of FIG. 1. As shown in FIG. 3, the offset idler hub 110 defines an inner surface 148 and an outer surface 150. In operation, the inner surface 148 is fixedly coupled to the ring dowel 115 and the idler gear 104 is rotatably coupled to the outer surface 150. The inner surface 148 is symmetric about a first central axis 154 and the outer surface 150 is symmetric about a different second central axis 156. Because of the eccentric shape of the offset idler hub 110, the first and second central axes 154, 156 are not coincident. In operation, the first central axis 154 is coaxial with the ring dowel centerline 120, and the second central axis 156 is coaxial with the idler gear centerline 116. The second central axis 156 is offset from the first central axis 154 by an offset magnitude 158 at an offset angle 160. In the embodiment illustrated in FIG. 3, the offset magnitude 158 is 0.250 mm and the offset angle 160 is 60.33 degrees. Other values are also within the scope of the present disclosure.

As illustrated in FIG. 3, the offset idler hub 110 defines an idler hub pilot 162. In an embodiment, the idler hub pilot 162 is a projection that extends from an end surface 164 of the offset idler hub 110. In an embodiment, the idler hub pilot 162 is a dowel pin that is press-fit into the offset idler hub 110. In an embodiment, the idler hub pilot 162 is a spring dowel pin. In operation, the idler hub pilot 162 engages an engine block pilot defined by the engine block 114 to position the offset idler hub 110 relative to the engine block 114. In an embodiment, the engine block pilot is a bore formed in the engine block 114 at a specific position on the engine block 114. The idler hub pilot 162, when engaged with the engine block pilot, is structured to constrain rotation of the offset idler hub 110 relative to the engine block 114 so as to maintain the intended offset angle 160.

Figure 4:
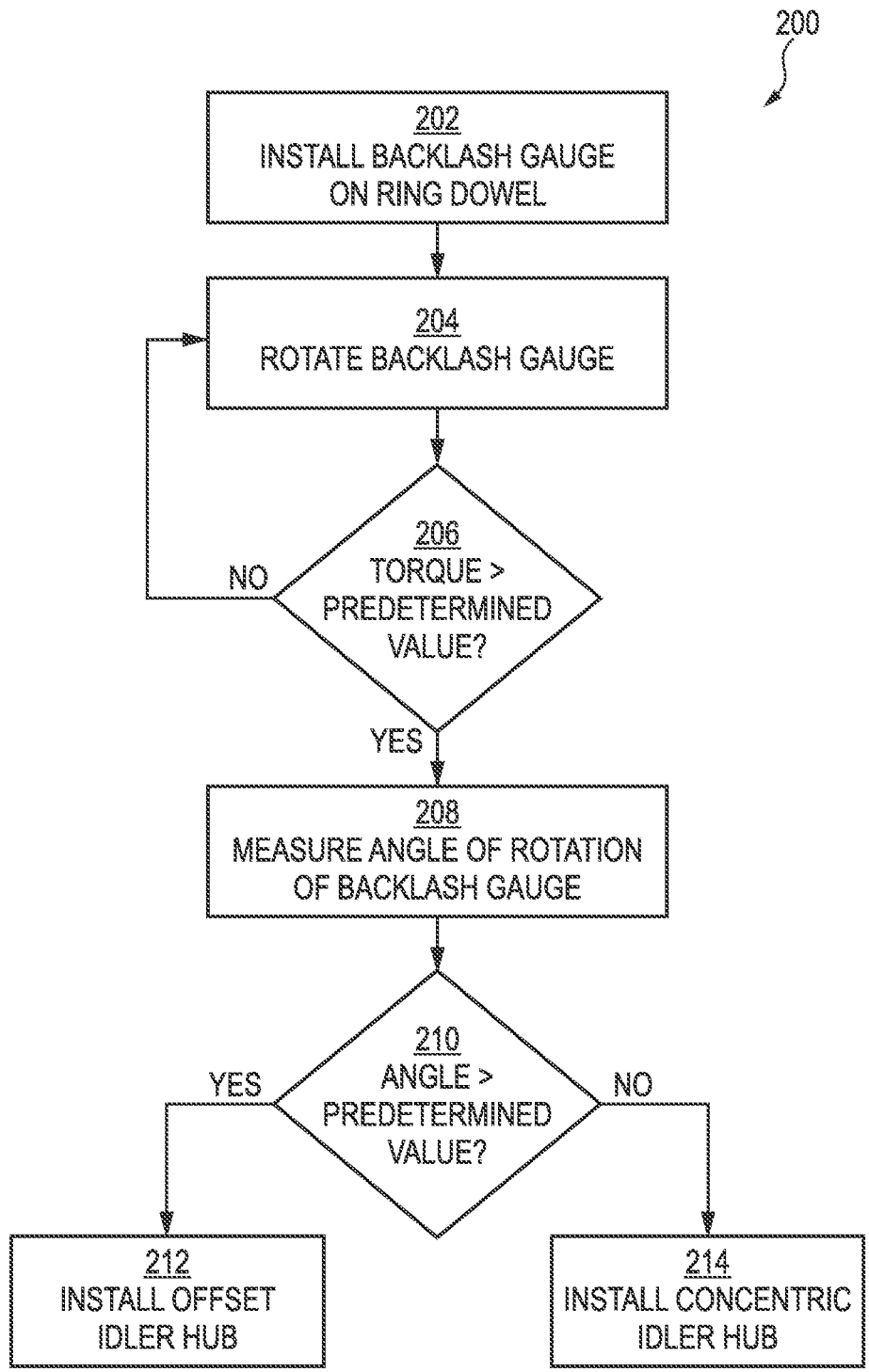
FIG. 4 is a flow diagram illustrating a method of manufacturing an engine, according to an embodiment.

FIG. 4 is a flow diagram illustrating a method 200 of manufacturing an engine, according to an embodiment. The method 200 involves utilizing a go/no-go gauge to determine whether to install a concentric idler hub or the offset idler hub 110. The go/no-go gauge is generally similar to the offset idler hub 110 in that it is eccentrically-shaped; however, the go/no-go gauge does not include the idler hub pilot 162, so the gauge is free to rotate. The angle of rotation at which the torque of rotating the gauge exceeds a predetermined value is related to the amount of offset that is required to achieve a desired backlash between the idler gear and the crankshaft gear. Thus, the method 200 is generally used when manufacturing an engine to determine whether to install a concentric idler hub or the offset idler hub 110. The method 200 is simple for a technician to perform, and does not add substantial time to manufacturing. Utilizing one of two idler hub options provides a cost-effective solution for minimizing the backlash between the idler gear and the crankshaft gear. There are other potential ways to reduce backlash, such as via an adjustable hub or via tighter manufacturing tolerances. However, either of these options is significantly more expensive than utilizing the method 200 to determine which of two idler hubs to install.

At 202, the backlash gauge is installed on the ring dowel 115. The backlash gauge is installed generally in the same way as a conventional idler hub. For example, the backlash gauge is installed on the ring dowel 115 and the idler gear 104 is installed on the backlash gauge. A torque wrench is attached to the backlash gauge.

At 204, the backlash gauge is rotated. As the backlash gauge is rotated, the gear teeth of the idler gear 104 and the crankshaft gear 106 mesh together.

At 206, the backlash gauge is rotated until the torque is greater than a predetermined value.

At 208, upon the torque exceeding the predetermined value at 206, the angle of rotation of the backlash gauge is measured. Because the backlash gauge is eccentrically-shaped, the angle of rotation at a particular torque value is indicative of the amount of offset that is required to achieve a desired backlash.

At 210, it is determined whether the angle of rotation exceeds a predetermined value. If the angle exceeds the predetermined value, at 212, the offset idler hub 110 is installed. If the angle does not exceed the predetermined value, at 214, the concentric idler hub is installed.

Rather than a go/no-go gauge, the method 200 may be similarly implemented utilizing other gauges. In some embodiments, the method 200 is implemented using a backlash gauge that directly measures backlash. The backlash gauge may measure backlash between the idler gear 104 and the crankshaft gear 106 and/or backlash between the idler gear 104 and the auxiliary gear 108. In some embodiments, the method 200 does not include the first process 202 or the second process 204 when the backlash gauge is utilized. Instead, the backlash gauge is placed proximate to (e.g., between, etc.) the idle gear 104 and one of the crankshaft gear 106 and the auxiliary gear 108. Rather than performing processes 206-210, the backlash gauge directly measures backlash and compares the measured backlash to an upper threshold and a lower threshold. If the measured backlash is between the upper threshold and the lower threshold, then the gear train 100 is arranged in an acceptable fashion (e.g., a concentric idler hub does not need to be replaced with the offset idler hub 110, etc.). However, if the measured backlash is not between the upper threshold and the lower threshold, then the gear train 100 is arranged in an unacceptable fashion (e.g., a concentric idler hub needs to be replaced with the offset idler hub 110, etc.), and the gear train 100 needs to be adjusted accordingly.

It should be understood that no claim element herein is to be construed under the provisions of 35 U.S.C. § 112(f), unless the element is expressly recited using the phrase "means for." The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams. Further, reference throughout this specification to "one embodiment," "an embodiment," "an example embodiment," or similar language means that a particular feature, structure, or characteristic described in connection with the embodiment is included in at least one embodiment of the present invention. Thus, appearances of the phrases "In an embodiment," "in an embodiment," "in an example embodiment," and similar language throughout this specification may, but do not necessarily, all refer to the same embodiment.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus, comprising:
   a crankshaft gear operatively coupled to an engine, the crankshaft gear having a crankshaft gear centerline;
   an auxiliary gear operatively coupled to the engine, the auxiliary gear having an auxiliary gear centerline;
   an idler gear operatively coupled to the engine, the idler gear in meshed engagement with each of the crankshaft gear and the auxiliary gear, the idler gear having an idler gear centerline;
   a ring dowel fixedly coupled to an engine block, the ring dowel having a ring dowel centerline; and
   an idler hub having an inner surface and an outer surface, the inner surface fixedly coupled to the ring dowel and the idler gear rotatably coupled to the outer surface, the idler hub being eccentrically-shaped, and the idler gear centerline offset from the ring dowel centerline.

2. The apparatus of claim 1, wherein:
   a first distance between the ring dowel centerline and the crankshaft gear centerline defines a nominal crankshaft gear center distance, and a second distance between the ring dowel centerline and the auxiliary gear centerline defines a nominal auxiliary gear center distance;
   a third distance between the idler gear centerline and the crankshaft gear centerline defines an offset crankshaft gear center distance, and a fourth distance between the idler gear centerline and the auxiliary gear centerline defines an offset auxiliary gear center distance; and
   a difference between the nominal crankshaft gear center distance and the offset crankshaft gear center distance is greater than 1.500 mm.

3. The apparatus of claim 2, wherein a difference between the nominal auxiliary gear center distance and the offset auxiliary gear center distance is less than 0.500 mm.

4. The apparatus of claim 3, wherein:
   a connecting line is defined between the ring dowel centerline and the auxiliary gear centerline, the connecting line defining a first angle relative to a datum on the engine block; and
   the idler gear centerline is offset from the ring dowel centerline by a first magnitude and a second angle relative to the datum.

5. The apparatus of claim 4, wherein the second angle is offset from the first angle by 90 degrees.

6. The apparatus of claim 1, wherein:
   the inner surface of the idler hub defines a first central axis;
   the outer surface of the idler hub defines a second central axis; and
   the second central axis is offset from the first central axis.

7. The apparatus of claim 6, wherein the second central axis is offset from the first central axis a distance of 0.250 mm.

8. An apparatus, comprising:
   a first gear positioned relative to an engine block, the first gear having a first centerline;
   a second gear positioned relative to the engine block, the second gear in meshed engagement with the first gear; and
   a hub having an inner surface and an outer surface, the inner surface coupled to the engine block and the outer surface coupled to the second gear, the hub facilitating rotation of the second gear relative to the engine block;
   wherein the inner surface has a second centerline, and
   wherein the outer surface has a third centerline offset from the second centerline.

9. The apparatus of claim 8, wherein the second centerline is offset from the third centerline a distance of 0.250 mm.

10. The apparatus of claim 8, wherein the inner surface is coupled to the engine block via a ring dowel fixedly coupled to the engine block.

11. The apparatus of claim 8, wherein the first gear is operatively coupled to a crankshaft of an engine associated with the engine block.

12. The apparatus of claim 8, wherein the first gear is operatively coupled to a crankshaft of an engine associated with the engine block.

13. The apparatus of claim 8, wherein:
   a first distance between the first centerline and the second centerline defines a nominal center distance;
   a second distance between first centerline and the third centerline defines an offset center distance; and the nominal center distance is not equal to the offset center distance.

14. The apparatus of claim 13, wherein, a difference between the nominal center distance and the offset center distance is greater than 1.500 mm.

15. The apparatus of claim 13, wherein, a difference between the nominal center distance and the offset center distance is less than 0.500 mm.

16. An apparatus, comprising:
a first gear operatively coupled to an engine, the first gear having a first gear centerline;
a second gear operatively coupled to the engine, the second gear having a second gear centerline;
a third gear operatively coupled to the engine, the third gear in meshed engagement with each of the first gear and the second gear, the third gear having a third gear centerline;
an idler hub having an inner surface and an outer surface, the inner surface fixedly coupled to the engine such that the idler hub is held at a first position relative to the engine, the outer surface rotatably coupled to the second gear, thereby facilitating rotation of the second gear relative to the engine, the idler hub being eccentrically-shaped.

17. The apparatus of claim 16, wherein:
the inner surface of the idler hub defines a first central axis;
the outer surface of the idler hub defines a second central axis; and
the second central axis is offset from the first central axis.

18. The apparatus of claim 17, further comprising a ring dowel fixedly coupled to the engine, the ring dowel having a third central axis aligned with the first central axis, wherein the inner surface is fixedly coupled to the ring dowel.

19. The apparatus of claim 17, wherein the first central axis is offset from the second central axis a distance of 0.250 mm.

20. The apparatus of claim 16, wherein the idler hub comprises a protrusion configured to be received within a cavity in the engine so as to prevent rotation of the idler hub relative to the engine block.

* * * * *